June 19, 1951 R. F. WEST ET AL 2,557,487

REPLY SIGNAL FOR TELEPHONES

Filed July 10, 1948 2 Sheets-Sheet 1

Inventors
Richard F. West
Edward R. Werner
By W. H. Holdwell
Attorney

June 19, 1951 R. F. WEST ET AL 2,557,487

REPLY SIGNAL FOR TELEPHONES

Filed July 10, 1948 2 Sheets-Sheet 2

Inventors
Richard F. West
Edward R. Werner
By W. [signature]
Attorney

Patented June 19, 1951

2,557,487

UNITED STATES PATENT OFFICE 2,557,487

REPLY SIGNAL FOR TELEPHONES

Richard F. West, Lynwood, and Edward R. Werner, Redondo Beach, Calif.

Application July 10, 1948, Serial No. 38,126

18 Claims. (Cl. 179—1)

Figures 1, 2:
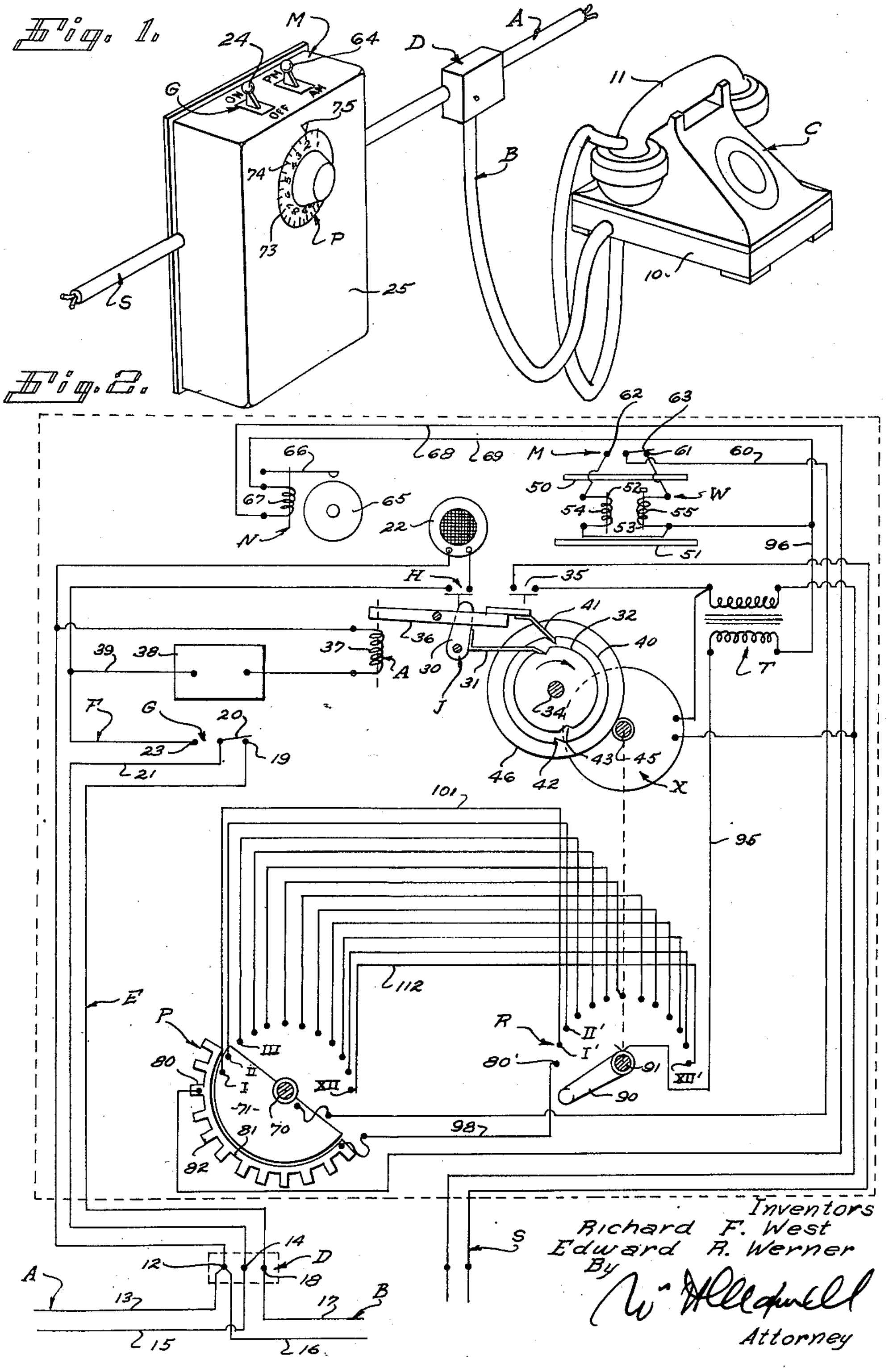

This invention relates to a reply signal for telephones, it being a general object of the invention to provide a signal system serving to initiate a signal on a telephone circuit from the receiving end thereof to communicate information to the sending or calling end of the circuit in the event that no one is available to operate the receiving end of the circuit.

On many occasions no one is present at the receiving end of a telephone circuit to operate the instrument when the usual call bell rings, and consequently the person at the calling end of the circuit must repeatedly call until some one is finally available to answer at the receiving end. This is not only time consuming and annoying for the person at the calling end of the circuit, but results in congestion of the telephone system and is not desirable generally to the operator of the system.

A general object of this invention is to provide a signalling system at the receiving end of a telephone circuit readily adjustable to send out a selected signal when the receiving end of the circuit is called, thus enabling the person normally at the receiving end of the circuit to communicate a message to the person at the calling end, giving such information, for example, as the time when the person at the receiving end will be available to answer the call.

It is a general object of the present invention to provide a signalling system for use in conjunction with a telephone circuit which generates several different tones or distinguishable sounds which may be readily combined to advantageously convey or impart desired information which may for example include the time of day, as for instance, a. m. or p. m., the hour and, if desired, the half hour. With a simple form or adaptation of the present invention a system is provided serving to send a time signal designating time within a range of half an hour.

An object of the present invention is to provide a signalling system of the general character referred to that will repeat the desired signal several times so that the person at the calling end of the system may hear it, if for any reason he did not hear it when first given.

Another object of the present invention is to provide a structure or apparatus of the general character described involving a case housing working parts and which may be mounted in any convenient location.

It is a further object of this invention to provide a signal system of the general character referred to which is very simple to operate and which is entirely free of delicate or intricate elements requiring accurate or careful manipulation. A typical form of the invention may involve merely an off and on switch and a dial freely rotatable and operating to effect the desired time selection as to hours and half hours.

Another object of this invention is to provide a signalling system of the general character referred to which utilizes an impulse from the telephone circuit with which the signalling system is coupled merely to initiate operation of the signal system, which signal system is energized from a separate source of power such, for example, as the circuit commonly available for illumination or like services.

It is another object of the present invention to provide a structure or apparatus of the general character referred to that can be easily and quickly coupled with a telephone circuit to operate in conjunction therewith and which is powered from an outside source without any interference with or danger of impairing the operation of efficiency of the telephone circuit.

A still further object of the present invention is to provide a device of the character described that is sufficiently audible so that a person at the receiving end, where the device is located, can hear it operate and is therefore advised that he is being called even though the telephone instrument at the receiving end is switched off.

Figures 3, 4, 5, 6, 7, 8, 9:
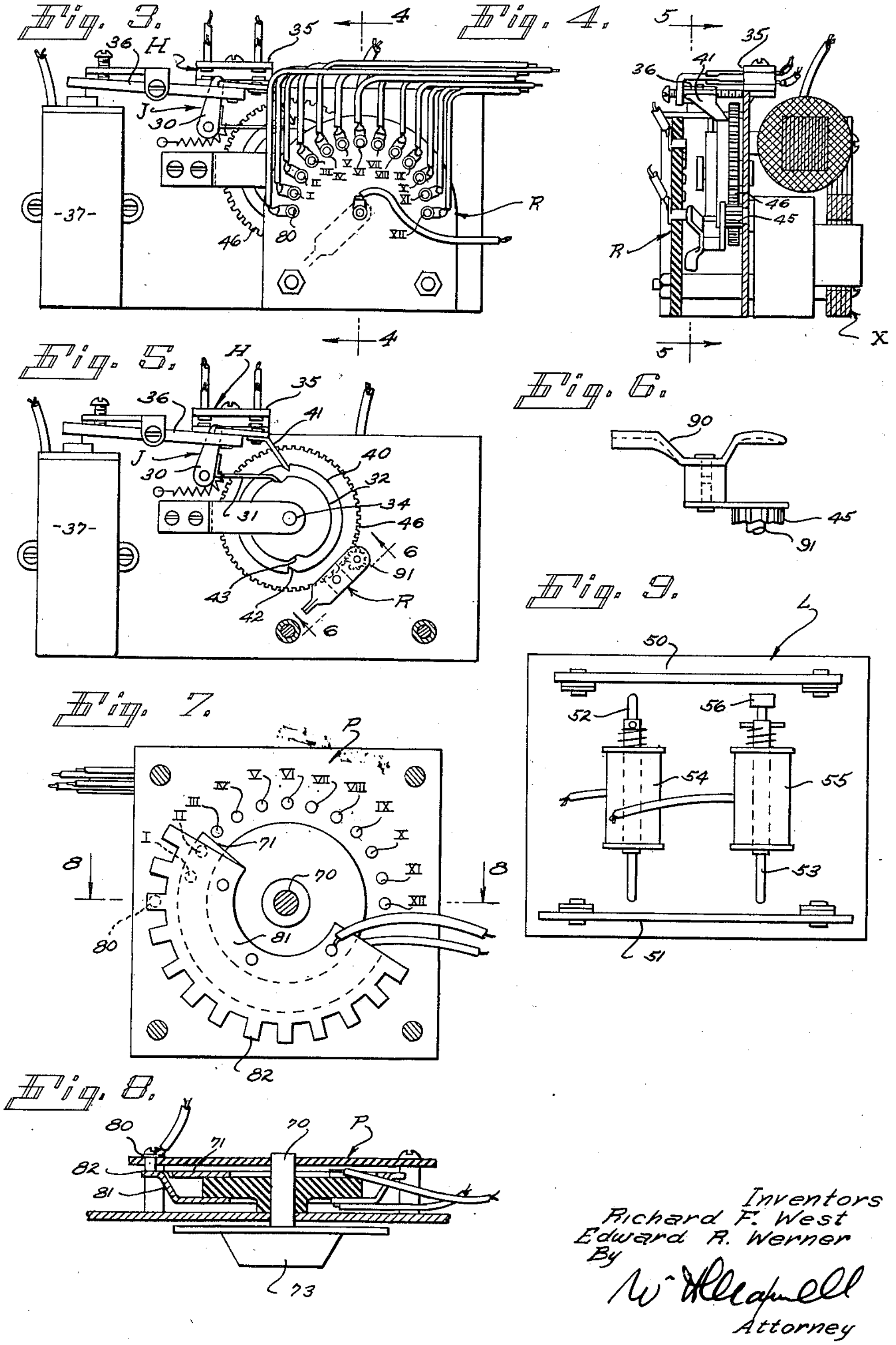

The various objects and features of our invention will be fully understood from the following detailed description of a typical preferred form and application of the invention, throughout which description reference is made to the accompanying drawings, in which:

Fig. 1 is a perspective view taken at the receiving end of a telephone circuit showing the telephone line with a usual or typical telephone instrument coupled thereto by a flexible extension, and showing the signalling apparatus of the present invention coupled thereto and with a power line. Fig. 2 is a diagrammatic view illustrating the apparatus provided by the present invention and showing the manner in which the apparatus of the present invention is related to a telephone circuit. Fig. 3 is a side elevation of a device embodied in the apparatus and showing it in an unactuated position. Fig. 4 is a transverse sectional view of the structure shown in Fig. 3 being a view taken as indicated by line 4—4 on Fig. 3. Fig. 5 is a longitudinal sectional view of the apparatus shown in Figs. 3 and 4, being a view taken as indicated by line 5—5 on Fig. 4. Fig. 6 is an enlarged detailed sectional view of an element of the apparatus taken as indicated by line 6—6 on Fig. 5. Fig. 7 is a side elevation of a device embodied in the apparatus. Fig. 8 is a sectional view taken as indicated by line 8—8 on Fig. 7, and Fig. 9 is a side elevation of another device embodied in the apparatus.

The signalling apparatus provided by the present invention is applicable to a typical or usual telephone system. In the drawings we have illustrated elements of the conventional telephone system at the receiving end thereof and have shown the main telephone lines carried in a cable A. A flexible extension B of the cable A extends to a conventional instrument C which involves, generally, a base 10 and a manually manipulated instrument 11 which incorporates an ear piece and mouth piece. In the case of conventional telephone equipment such as is illustrated a weak direct current is maintained in the line A and serves as the carrier current for the voice signals. Alternating current is sent over the line A when it is desired to operate the call bell located in the base 10 of instrument C. In the preferred application of the present invention a junction box D is provided, coupling the main telephone line A and the extension B thereof, and also providing means for connection or coupling the signalling system that we have provided with the telephone circuit to function in conjunction therewith, as will be hereinafter described. The junction box D usually occurs close to the instrument C and may for the purpose of the present invention be considered as part of or as an accessory to the instrument C.

The apparatus or system provided by the present invention involves, primarily, two main circuits, one a voice circuit carried by a line E, and the other a signal receiving circuit carried by a line F. The invention provides a selector switch G having two positions, one closing the circuit through line E and the other closing the circuit through line F. The invention further involves, generally, a signal control switch H coupled in and controlling the signal receiving circuit through line F and it includes an operating means J effecting operation of the switch H and under control of alternating current impulses received from the telephone line A, such as would normally operate the call bell of the telephone, and involving time delay means serving to hold the switch H closed a predetermined length of time.

A main signal generator L is provided and is preferably of a dual type capable of generating audible signals of two different characters or of distinguishable character. A primary selector switch M is related to the main signal generator so that it may be set at will to generate either one or the other of the signals. The invention preferably provides a secondary signal generator N operable to generate an audible signal of a character readily distinguishable from the signals generated by the generator L.

Combined with the signal generators there is a signal circuit selector P and a signal circuit maker R which elements are interconnected to have definite cooperative relationship and serve to control operation of the signal generators. It is further desirable, in practice, where the signal apparatus is to be energized from a power line S carrying current ordinarily utilized for operating lights, household appliances, etc., that the apparatus include a transformer T so that the various operating elements of the apparatus operate under low voltage and can therefore be of light inexpensive construction and are free of the difficulties that attend electrical equipment carrying high voltage.

The particular junction box D illustrated in the drawings has a terminal 12 to which one of the main telephone lines 13 is connected, and has a terminal 14 to which the other main telephone line 15 is connected. Line 16 of the flexible extension B is coupled to terminal 12 while the line 17 of the flexible extension B is coupled to a third terminal 18 in the box D.

The line E carrying the voice circuit extends from terminal 18 to a fixed pole 19 of switch G. The shiftable contact 20 of switch G is coupled to the terminal 14 by a line 21. The line F carrying the signal receiving circuit extends from terminal 12 to a signal receiver or pick-up element 22 through switch H to fixed terminal 23 of switch G. When the movable contact of selector switch G is in one position, as for instance as shown in Fig. 2, the voice circuit carried by line E is closed so that the telephone instrument C is coupled with the main telephone line A to operate in the normal or usual manner, and the signalling apparatus provided by the present invention is wholly inoperative or cut out. When the shiftable contact 20 is in the other position or in engagement with contact 23 the circuit to the telephone is open and line F is closed at switch G and is operative when and as soon as switch H is closed. It will thus be seen that the switch G is a selector switch with an operating part or handle 24 accessible at the exterior of a case 25 that carries the various elements of the apparatus provided by the present invention.

The signal control switch H is connected in line F in series with the pick-up unit 22 and switch G and it is such as to complete the signal receiving circuit when closed.

The operating means J for the switch H is shown as involving a pivoted lever or bell crank having an arm 30 operatively engaging the movable element of switch H and an arm 31 operatively engaged by a cam 32. The cam is fixed on a rotatable shaft 34 and when rotated from an unactuated position such as is shown in Fig. 2 in the direction indicated by the arrow in that figure, arm 31 is operated causing arm 30 to close switch H.

The time delay means provided to operate the cam 32 includes the motor X which is energized from the power line S through a starting switch 35. The starting switch 35 is operated by a pivoted lever 36 operated when a coil 37 is energized. The coil 37 is connected in the signal receiving circuit carried by line F in parallel with switch G. A suitable condenser 38 is connected in the line 39 carrying the coil 37 and serves to cut out the direct current that may flow from the telephone lines but passing alternating current of a character such as to actuate the call bell of the telephone instrument.

The coil 37 is such that when alternating current of a character normally operating the call bell of the telephone is passed through the coil 37 the lever 36 is operated in a manner to close switch 35. Closing of switch 35 closes the power circuit to the motor X. The switch 35 is held closed as the motor operates by a cam 40 which cooperates with a cam follower 41 carried by or projecting from the lever 36. The cam 40 holds the switch closed for a predetermined length of time or until the follower 41 drops into a recess 42 in the cam. It is to be observed that the cam 40 is on the shaft 34 which also carries cam 32 and that cam 32 has recesses 43 receiving the cam following arm 31 shaped so that the arm 31 is dropped immediately before follower 41 is dropped.

The motor X is operatively coupled with the cams by a pinion 45 on the motor shaft driving a gear 46 fixed on the shaft 34. The motor X is preferably a synchronous motor operating at a predetermined speed and through the gearing the cams are rotated at a predetermined speed and the parts are so related that a predetermined time interval occurs from the time the lever 36 is operated, closing switch 35 and subsequently causing switch H to be closed until the follower 41 and arm 31 are received in the recesses allowing the switches 35 and H to open in the sequence above described. It will be apparent that when the switches 35 and H are open the motor stops operation and the signal receiving circuit is opened and these switches remain open until another alternating current impulse is received over the telephone line energizing coil 37 which initiates another cycle of operation such as has just been described.

The main signal generator L may be any form or type of sound or signal generator. The invention contemplates a sound pick-up 22 in the signal receiving circuit and therefore, the sound generator L is a mechanism serving to generate sound of such character as to be properly picked up by the unit 22.

In accordance with the preferred form of the invention the signal generator L is of the dual type, that is, it serves to generate either one of two different signals. The particular generator illustrated involves two bells 50 and 51 of different tones, and two strikers 52 and 53 operable by coils 54 and 55, respectively to strike the bells. In the case illustrated springs are provided in connection with the strikers to normally urge them in one direction or to strike in one direction so that when the coils are energized the strikers operate in the opposite direction. The striker 52 is such as to strike bell 50 when operated in one direction and to strike bell 51 when operated in the opposite direction, with the result that when coil 54 operating striker 52 is energized a two tine signal is generated. The striker 53 has a cushion or dampener 56 on one end and engageable with bell 50, with the result that when coil 55 is energized no signal is generated when the cushion strikes the bell 50 but a single tone only is generated by the striking of bell 51.

The primary signal selector M serves as a means for setting the signal generator L so that only one of the strikers is operated and it is coupled in a line 60 to the generator L and is in the nature of a two-way switch having a fixed terminal 61 coupled with one terminal of coil 55 and a fixed terminal 62 coupled with the corresponding terminal of coil 54. A movable contact 63 to which line 60 couples is shiftable to engage with contact 61 or contact 62. When contact 61 is engaged the selector M is set so that striker 53 will be operated, whereas when contact 62 is engaged striker 52 will be operated. The movable contact 63 of selector M is preferably under control of a manually operable element 64 accessible at the exterior of the case 25. In a typical application of the invention when the main signal generator gives a single tone each time it is operated, the time or portion of the day indicated may be a. m., whereas when two tones are given, the portion of the day indicated may be p. m., or if desired, the meaning of these two different signals may be reversed, or may be such as to give meanings other than a. m. or p. m.

If it is desired that the signalling device give signals designating only hours or hour intervals, the signal generator M is all that is required. However, it is generally desired that the device give signals designating not only hours but also half hours. In this case it is desired to provide a secondary signal generator N which is such as to generate a signal distinctly different from the signals generated by generator M so that it is readily distinguishable therefrom. In the case illustrated the generator N is indicated as a bell type device in which a bell 65 of a tone distinctly different from the gong-type bells 50 and 51 is gained. A striker 66 is provided to engage bell 65, and a coil 67 is provided for operating the striker. The coil is carried in a circuit carried by lines 68 and 69.

The signal circuit selector P operates in conjunction with the signal circuit maker R so that a predetermined number of signals is generated by the main signal generator L upon each operation of the apparatus, and if a half hour interval is to be indicated a single operation of the generator N occurs, following full operation of the generator L.

The signal circuit selector P as provided by the present invention involves, generally, a series of fixed contacts and a movable contact engageable with one or more of the fixed contacts, depending upon the setting of the movable contact. In the preferred form of the invention the main signal generator operates to generate signals designating the hour of the day, the hours during a. m. being distinguished from the hours during p. m. by the single or dual tone generated by the generator L. In such case the circuit selector P is provided with twelve fixed contacts designated I, II, III, IV, V, VI, VII, VIII, IX, X, XI and XII. These contacts are arranged in a series about a shaft 70 which carries the movable contact 71 which is a segmental member. It is preferred that the series of fixed contacts be semicircular in form or pattern and that the segmental contact be substantially semi-circular as shown in the drawings.

With this general relationship of parts clearly illustrated in diagram, Fig. 2, it will be apparent that the movable contact 71 can be moved to a position to engage the fixed contacts starting with contact I and progressing until it engages all of the contacts, including contact XII. The shaft 70 projects from case 25 and carries an operating knob 73 at the exterior of the case, which knob has graduations 74 thereon cooperating with a reference mark 75 with the graduations forming a scale corresponding to that found on the dial of a clock and designating hours and half hours. When the scale is set to indicate a particular hour, say for instance the hour 2:00, as shown in Fig. 1, contacts I and II are engaged by contact 71.

The circuit selector further includes a fixed contact 80 and a movable arcuate contact 81 carried by shaft 70 insulated from contact 71 and having projecting fingers 82 so spaced as to contact or engage the contact 81 each time the shaft 70 is in a position where the dial 73 indicates a half hour interval.

The signal circuit maker R involves, generally, a plurality of fixed contacts I', II', III', IV', V', VI', VII', VIII', IX', X', XI', XII', arranged in a series corresponding to the fixed contacts I to XII, inclusive, of circuit selector P, and a movable contact arm 90 on a shaft 91 driven by the motor X so that it rotates and successively engages the fixed contacts engaging them one at a time and during each operation or each cycle of operations engaging first the contact XII′, then the contact XI′, then the contact X′ and so on until it finally contacts the contact I′.

The circuit maker R further includes fixed contact 80′ located adjacent the fixed contact I′, so that when the movable contact 90 leaves contact I′ it then momentarily engages or contacts the fixed contact 80′. It is to be observed from Fig. 2 of the drawings that the several fixed contacts of the maker R as just described are grouped so that they extend about halfway around the circle through which the movable contact 90 sweeps, with the result that there is a substantial time interval between the time the movable contact leaves fixed contact 80′ until it again engages contact XII′. The relationship of parts is preferably such that the movable contact 90 makes several revolutions and consequently sweeps over the fixed contacts several times, each time the operating means J completes a full cycle of operation under control of the time delay mechanism above described.

The signal circuit selector and the signal circuit maker as above described are in series with each other in the secondary circuit of transformer T which secondary circuit carries the signal generators L and N. For example, a line 95 from one pole of the secondary of transformer T may extend to the movable contact 90 of the circuit maker R, while a line 96 from the other pole of the transformer's secondary circuit connects with coils 54 and 55 of the single generator L and with line 69 connected with coil 67 of signal generator N.

The line 60 from a selector M connects to the movable contact 71 of circuit selector P while the line 68 from coil 67 of signal generator N connects to the fixed contact 80 of selector P. A line 98 connects with the fixed contact 80′ of circuit maker R with the movable contact 81 of the selection P. Lines 101 to 112 connect with fixed contacts I to XII, respectively of the selector P and extend to and connect with contacts I′ to XII′, respectively, of maker R.

The shaft 91 of circuit maker R being operatively coupled with the motor X when the signalling apparatus is put into operation to operate through a full cycle governed as to time by the timing means in the operating means J, the contact 90 of the maker R first engaged fixed contact XII′ and then engages the other fixed contacts of maker R successively or one at a time, until it has finally contacted the fixed contact 80′. Assuming the selector to be set so that the movable contact 71 is in engagement with one or more of the fixed contacts of the selector, a circuit is completed to the signal generator L each time the contact 90 engages a fixed contact of the circuit maker having a connected contact of the selector P in contact with the movable contact 71 of the selector. For example, if the movable contact 71 is set, as shown in Fig. 2 where it contacts fixed contacts I and II, then as the movable contact 90 of the circuit maker R makes a complete revolution two impulses will reach the signal generator L, one when contact 90 contacts fixed contact II and the other when contact 90 engages fixed contact I. If the dial 73 is set at a half hour interval, in which case one of the fingers 82 is in engagement with the fixed contact 80 of selector P, then an additional impulse reaches the generator N as the contact 90 engages the fixed contact 80′.

It will be apparent from the foregoing description how through operation of selector M the main signal generator may be set to generate signals designating either a. m. or p. m., how the dial 73 may be set so that the number of operations of the main signal generator designates the desired hour as for instance one operation of generator L designating the hour 1:00, two operations designating the hour 2:00, etc. and it will be apparent that if the dial 73 is set to designate a half hour interval the secondary signal generator N operates, following operation of the main generator L, giving the additional signal designating a half hour interval.

From the foregoing description it is believed that the operation of the apparatus will be fully understood. When the switch G is set to close the voice circuit the telephone system works in the normal or usual manner. When the switch G is set to close the signal receiving circuit then signals from the generators L and N are picked up by the pick-up unit 22, and are heard at the calling end of the telephone circuit over the line A. The operation of the signalling apparatus is initiated as above described by the alternating current received over the telephone line A and normally intended to operate the call bell in instrument C. It will be apparent that the signal generated by the apparatus and heard at the sending or calling end of the telephone system will depend upon setting of selector M and upon the setting of dial 73. If the person setting the apparatus wishes the hour and half hour indicated by the signal to be understood as a. m. selector M is set in one position. If it is to be understood as p. m. the selector M is set in the opposite position. It will be fully understood how the number of operations or full signals given by the generator L designates the hours and how the signals from generator N designate the half hours. Thus it will be apparent that with the apparatus that we have provided signals may be given designating any desired time of day or night in half hour intervals.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument end thereof, a signal generator including a control operated by current received directly from the line of the telephone system, the generator acting in response to a current impulse received from the telephone circuit to deliver a signal to be received by the pick-up, a control switch controlling the signal receiving circuit, and an operating means for the control switch including, a motor, a motor switch, an electro-magnetic means energized by said impulse and operating the motor switch, and a cam actuated member driven by the motor and operating the control switch.

2. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a signal generator acting in response to a current impulse received from the telephone circuit to deliver a signal to be received by the pick-up, a control switch controlling the signal receiving circuit, and an operating means for the control switch including, a motor, a motor switch, an electro-magnetic means energized by current from the line of the telephone system and operating the motor switch, a cam operated by the motor closing the control switch, and a cam operated by the motor holding the motor switch closed a predetermined length of time.

3. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a signal generator acting in response to an impulse received from the telephone circuit to deliver a signal to be received by the pick-up, a control switch controlling the signal receiving circuit, and an operating means for the control switch including a motor, a motor switch, an electromagnetic means energized by current from the line of the telephone system and operating the motor switch, a cam operated by the motor holding the motor switch closed a predetermined length of time, and a cam operated by the motor holding the control switch closed while the motor switch is closed.

4. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a signal generator acting in response to an impulse received from the telephone circuit to deliver a signal to be received by the pick-up, a control switch controlling the signal receiving circuit, and an operating means for the control switch including, a motor, a motor switch, an electromagnetic means energized by current from the line of the telephone system and operating the motor switch, a pivoted lever operating the motor switch, a coil energized by said impulse and operating the lever, a cam operated by the motor holding the motor switch closed a predetermined length of time, and a cam operated by the motor holding the lever operated while the motor is operating.

5. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a signal generator acting in response to an impulse received from the telephone circuit to deliver a signal to be received by the pick-up, a control switch controlling the signal receiving circuit, and an operating means for the control switch including, a motor, a motor switch, an electromagnetic means momentarily energized by current from the line of the telephone system and operating the motor switch, and a cam actuated member driven by the motor and operating the control switch, the signal generator being a dual generator operable to deliver either one of two distinguishable signals.

6. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a signal generator acting in response to an impulse received from the telephone circuit to deliver a signal to be received by the pick-up, a control switch controlling the signal receiving circuit, and an operating means for the control switch including, a motor, a motor switch, an electromagnetic means momentarily energized by current from the line of the telephone system and operating the motor switch, and a cam actuated member driven by the motor and operating the control switch, the signal generator being a dual generator operable to deliver either one of two distinguishable signals and including a selector determining which of the signals is delivered.

7. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a signal generator acting in response to an impulse received from the telephone circuit to deliver a signal to be received by the pick-up, a control switch controlling the signal receiving circuit, and an operating means for the control switch including, a motor, a motor switch, an electro-magnetic means momentarily energized by current from the line of the telephone system and operating the motor switch, and a cam actuated member driven by the motor and operating the control switch, the signal generator being a dual generator operable to deliver either one of two distinguishable signals and including a manually operable selector determining which of the signals is delivered.

8. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a signal generator acting in response to a current impulse received from the telephone circuit to deliver a signal of a predetermined character to be picked up by the signal pick-up, and a control for the generator operated by current from the line of the telephone system and including a circuit selector and a circuit maker connected in series.

9. A signal system applicable to a telephone system having a terminal instrument with a sender and receiver and a line carrying the usual telephone circuit between the instrument and a central station end of a telephone circuit including, a voice circuit carrying the usual telephone current, a signal receiving circuit including a signal pick-up, a selector switch selectively connecting said circuits with the telephone line at the instrument, a signal generator, a generator control switch controlling a circuit to the generator, operating means for the signal control switch in the signal receiving circuit, operating means closing said generator control switch and said signal control switch for a predetermined length of time in response to an impulse received from the telephone circuit, and a control for the generator manually adjustable to deliver one or more operating impulses to the generator and including a manually operated circuit selector and a power operated circuit maker coupled in series with the selector.

10. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a signal generator, a generator control switch controlling a circuit to the generator, operating means for the signal control switch in the signal receiving circuit, operating means closing said generator control switch and said signal control switch for a predetermined length of time in response to an impulse received from the telephone circuit and including a timing motor, and a control for the generator manually adjustable to deliver one or more operating impulses to the generator and including a manually operated circuit selector and a circuit maker coupled in series with the selector and driven by the selector.

11. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a signal generator, a generator control switch controlling a circuit to the generator, operating means for the signal control switch in the signal receiving circuit, operating means closing said generator control switch and said signal control switch for a predetermined length of time in response to an impulse received from the telephone circuit, and a control for the generator manually adjustable to deliver one or more operating impulses to the generator and including a manually operated circuit selector and a power operated circuit maker coupled in series with the selector, the signal generator being a dual generator operable to deliver either one of two distinguishable signals and including a selector determining which of the two signals is delivered.

12. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a main signal generator, a secondary signal generator, a generator control switch controlling a circuit to the generators, operating means for the signal control switch in the signal receiving circuit, operating means closing said generator control switch and said signal control switch for a predetermined length of time in response to an impulse received from the telephone circuit, and a control for the generators manually adjustable to deliver one or more operating impulses to the main generator and a single impulse to the secondary generator and including a manually operated circuit selector and a power operated circuit maker coupled in series with the selector.

13. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument, a main signal generator, a secondary signal generator, a generator control switch controlling a circuit to the generators, operating means for the signal control switch in the signal receiving circuit, operating means closing said generator control switch and said signal control switch for a predetermined length of time in response to an impulse received from the telephone circuit, and a control for the generators manually adjustable to deliver one or more operating impulses to the main generator and a single impulse to the secondary generator and including a manually operated circuit selector and a power operated circuit maker coupled in series with the selector, the circuit selector including a series of fixed contacts and a shiftable contact establishing one or more circuits to the main generator to be closed by the maker and including a fixed contact and a shiftable contact selectively engageable to establish a circuit to the secondary generator under control of the maker.

14. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuit with the telephone line at the instrument, a main signal generator, a secondary signal generator, a generator control switch controlling a circuit to the generators, operating means for the signal control switch in the signal receiving circuit, operating means closing said generator control switch and said signal control switch for a predetermined length of time in response to an impulse received from the telephone circuit, and a control for the generators manually adjustable to deliver one or more operating impulses to the main generator and a single impulse to the secondary generator and including a manually operated circuit selector and a power operated circuit maker coupled in series with the selector, the circuit selector including a series of fixed contacts and a shiftable contact establishing one or more circuits to the main generator to be closed by the maker and including a fixed contact and a shiftable contact selectively engageable to establish a circuit to the secondary generator closed by the maker following closing of the circuits to the main generator.

15. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument end thereof, a signal generator in electrical connection with the telephone line and acting in response to signal current received from the telephone circuit to deliver a signal to be received by the pick-up, a control switch controlling the signal receiving circuit, and a motor driven operating means for the control switch including an electro-magnetic control energized by said impulse.

16. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at the instrument end thereof, a signal generating acting in response to an impulse received from the telephone circuit to deliver a signal to be received by the pick-up, a control switch controlling the signal receiving circuit, a motor driven operating means for the control switch including an electro-magnetic control energized momentarily by current from said line and means holding the motor of the operating means in operation a predetermined length of time.

17. A signal system applicable to a telephone system having a terminal instrument with a sender and receiver and a line carrying the usual telephone circuit between the instrument and a central station including, a voice circuit carrying the usual telephone current, a signal receiving circuit including a signal pick-up, a selector switch selectively connecting said circuits with the telephone line at said instrument, a signal generator including a control operated by signal current from said telephone line, the generator operating to deliver a signal of a predetermined character to be picked up by the signal pick-up, the signal generator being a dual generator operable to deliver either one of two differing signals, and selecting means determining the signal delivered by the generator.

18. A signal system applicable to a telephone system having a terminal instrument with a sender and receiver and a line carrying the usual telephone circuit between the instrument and a central station including, a normally unactuated signal generator, a control acting to put the generator into operation and operated by signal current from said line, and means coupling the output of the generator and the control with the line at the instrument, the control being responsive to signals from the line, the signal generator being a dual generator operable to deliver either one of two differing signals, and selecting means determining the signal delivered by the generator.

RICHARD F. WEST.
EDWARD R. WERNER.

REFERENCES CITED

The following references are of record in the file of this patent:

UNITED STATES PATENTS

| Number | Name | Date |
|---|---|---|
| 1,936,700 | Wells | Nov. 28, 1933 |
| 2,005,788 | Keiser | June 25, 1935 |
| 2,261,420 | Shively et al. | Nov. 4, 1941 |
| 2,376,272 | Peterson et al. | May 15, 1945 |